Feb. 6, 1962  S. F. JOHNSTON, JR  3,020,542
MOUNTING AIRCRAFT WITH PLURAL SPHERICAL LUNEBERG RADAR
REFLECTIVE LENSES AND MOUNTING MEANS
Filed March 29, 1960  2 Sheets-Sheet 1

INVENTOR.
SIDNEY F. JOHNSTON, JR.
BY
ATTORNEYS

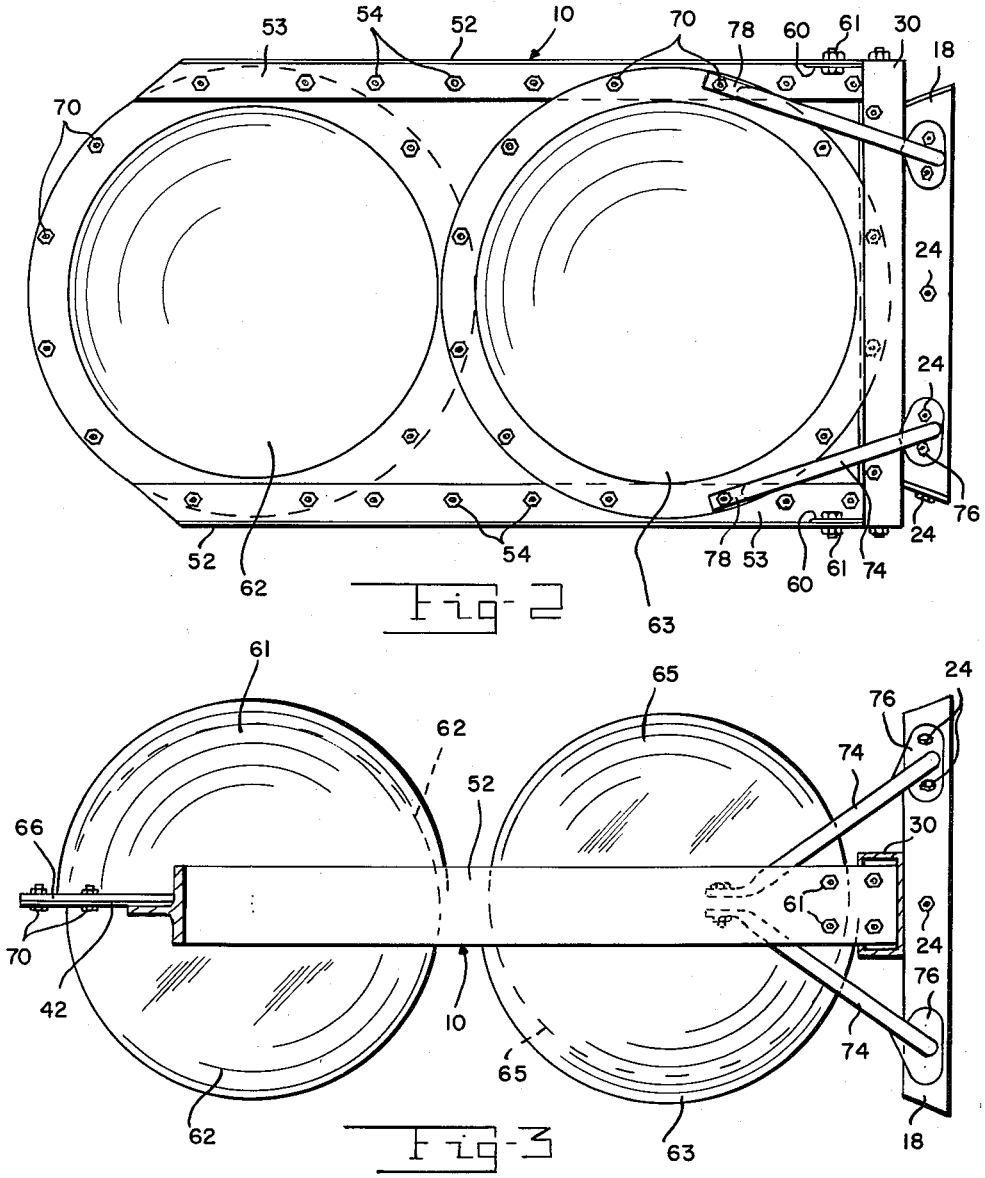

3,020,542
MOUNTING AIRCRAFT WITH PLURAL SPHERICAL LUNEBERG RADAR REFLECTIVE LENSES AND MOUNTING MEANS
Sidney F. Johnston, Jr., Knoxville, Tenn., assignor to the United States of America as represented by the Secretary of the Air Force
Filed Mar. 29, 1960, Ser. No. 18,456
4 Claims. (Cl. 343—18)
(Granted under Title 35, U.S. Code (1952), sec. 266)

The invention described herein may be manufactured and used by or for the United States Government for governmental purposes without the payment to me of any royalty thereon.

This invention relates generally to a passive radar reflective target and the related mounting bracket and, more particularly, to a cantilever mounting means for a pair of Luneberg radar reflective lenses on the tail section of an aircraft to reflect radar energy in the direction from which it originated.

There are many times when it is desirable to provide an aircraft with increased radar reflecting capabilities without necessitating a major transformation on the aircraft. A few examples of this would be to transform an obsolete type of aircraft to a target drone, utilizing the aircraft for testing radar equipment, provide improved tracking characteristics for all types of aircraft, and for simulating on a tracking radar scope the appearance of a larger aircraft for military purposes.

Prior to the instant invention, the above named functions were performed by attaching circular corner reflectors at various points on an aircraft; however, this method proved to be unsatisfactory due to the inherently small conical viewing angle of the conventional corner reflector. The use of a plurality of Luneberg radar reflective lenses, according to the present invention, eliminates this difficulty by providing an effective radar cross section many times that of the circular corner reflector.

It is, therefore, an object of the present invention to provide a radar reflective return means mounted on high performance aircraft for providing maximum radar reflecting capacity with a minimum number of Luneberg radar reflective lenses.

It is another object of the present invention to provide a cantilever mounting means for a radar reflecting apparatus positioned on the tail section of a high performance aircraft so as not to interfere with the flight envelope and all weather characteristics of the aircraft.

It is a further object of the present invention to provide a cantilever mounting means for a plurality of Luneberg radar reflective lenses on the tail section of an aircraft for reflecting radar signals back to the transmitting source to simulate on the radar screen the appearance of a larger aircraft, for facilitating radar tracking of the aircraft, or for transforming the aircraft to a radar testing aircraft or a target drone.

According to the present invention, the novel radar reflective return means and mounting bracket comprises in combination with an aircraft a pair of spherical Luneberg radar reflective lenses, and means mounting the lenses adjacent the tail section of an aircraft. The mounting means includes a large center plate having a pair of lens-receiving openings therein, means for maintaining the lenses within the openings, a pair of rigidity-inducing, oppositely disposed framing T's secured to the center plate, means for mounting the bracket in cantilever fashion onto the aircraft tail section, and a plurality of sway braces connecting the center plate to said mounting means to stabilize the bracket.

These and other objects and features of the present invention will be readily apparent when the following description is viewed in connection with the accompanying drawings in which:

FIG. 2 is a side view of the mounting bracket and radar reflective Luneberg lenses of the present invention;

FIG. 3 is a top view of the mounting bracket and lenses of the present invention.

Figure 1:
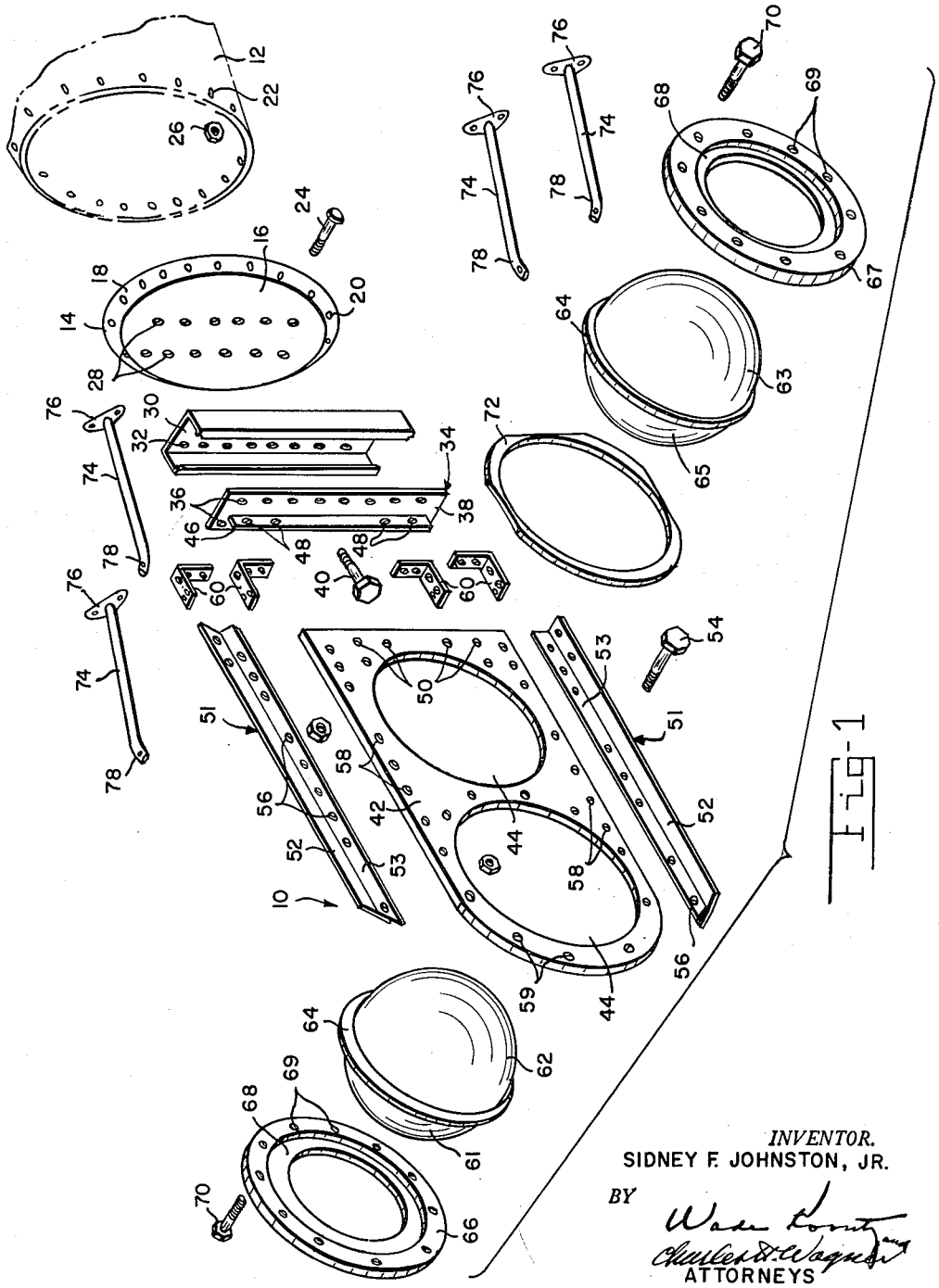
FIG. 1 is an exploded assembly view of the mounting bracket of the present invention.

Referring now in detail to the drawings wherein like reference numerals designate like parts, and more particularly to FIG. 1, there is shown the mounting bracket of the present invention indicated generally at 10 and mounted on the tail section 12 of an aircraft by means of cover plate 14. Cover plate 14 is secured to the tail section 12 of the aircraft when the tail cone is removed by means of a plurality of bolts 24 extending through a plurality of holes 20 extending peripherally along a radially flared flange portion 18 of cover plate 14 and a corresponding plurality of holes 22 extending peripherally of the open end of tail section 12. Each of the bolts 24 is locked in its respective position by a related locking nut 26. A central disk portion 16 of cover plate 14 has a pair of parallel rows of holes 28 spaced for alignment with a corresponding pair of parallel rows of holes 32 in a U-shaped, channel bracket 30. A T shaped bracing bar 34 having a base portion 38 and a leg portion 46 is adapted for locking engagement within bracket 30 by means of a plurality of bolts 40 extending through a pair of parallel rows of holes 36 spaced on base portion 38 and aligned with holes 32 and 28 of bracket 30 and disk portion 16, respectively.

A central, lens-retaining plate 42 having a plurality of spaced holes 50 therein is attached to the leg portion 46 of bracing bar 38 by a suitable number of bolts and related locking nuts extending through holes 50 and corresponding holes 46 in plate 42 and leg portion 46, respectively. A pair of reinforcing, longitudinally extending T shaped framing bars 51 are securely attached to either side of center plate 42 by means of a plurality of bolts 54 extending through a plurality of spaced holes 56 in the leg portion 53 of framing bars 51 and a corresponding number of holes 58 in center plate 42, respectively. The structural strength of the mounting bracket 10 is further increased by means of two pairs of L-shaped clips 60 adapted to be secured to the base portion 52 of framing bars 51 and the base portion 38 of bracing bar 34. Additional rigidity of the mounting bracket 10 is provided by the four sway braces 74, which are secured at one end 76 to the flange portion 18 of cover plate 14 and at the other end 78 to the leg portion 53 of framing bar 51 by a plurality of bolts 70.

Adapted to be secured within a pair of lens receiving openings 44 in center plate 42 are a pair of tandem-mounted, spherical Luneberg radar reflective lenses 62 and 65, respectively. Each of the lenses 62 and 65 has a hemispherical reflector 61 and 63, respectively, and an annular retaining flange 64. As will be seen in FIG. 1, lens 62 is mounted within lens receiving opening 44 from the port side of mounting bracket 10 and secured thereto by means of an annular mounting ring 66 having an inner annular recess 68 adapted for abutting relation with the retaining flange 64 on reflector 61. Mounting ring 66 is secured to center plate 42 by a plurality of bolts 70 extending through holes 69 in mounting ring 66 and holes 59 in center plate 42.

Luneberg radar reflective lens 65 and its associated reflector 63 are mounted on the starboard side of center plate 42 by an arrangement similar to that of lens 62. Because the leg portions 53 of framing bars 51 are also mounted on the starboard side of center plate 42, a filler ring 72 of substantially the same thickness as the leg portions 53 is juxtaposed with the forward lens receiving opening 44 to provide a continuous flat surface for the annular flange 64 of lens 65 to abut when the mounting ring 67 is secured to the center plate 42 by a plurality of bolts 70.

In operation, the complete mounting bracket 10 would normally be preassembled and is easily and quickly mounted on the tail section of an aircraft simply by removing the tail cone therefrom and fitting the radially flared flange portion 18 of cover plate 14 over the opening left thereby. The Luneberg radar reflective lenses 62 and 65, respectively, may be easily and quickly removed from the mounting bracket 10, if desired, merely by removing bolts 70 and the four sway braces 74, leaving the rest of mounting bracket 10 intact. Since the Luneberg radar reflective lenses 62 and 65, respectively, are mounted facing in opposite directions, the two Luneberg lenses will afford a substantially 360° pickup of radar beams and, due to the inherent ray receiving and reflecting characteristics of a Luneberg radar reflective lens, will powerfully and directly re-radiate the radar beams back to the transmitting source.

The present invention has been described above in detail for the purpose of illustration only and is not intended to be limited by this description or otherwise, except as defined in the appended claims.

I claim:

1. In combination with an aircraft, a radar reflective return means consisting of a plurality of Luneberg radar reflective lenses each having an attached hemispherical radar reflector, mounting means attaching said Luneberg radar reflective lenses to the aircraft, said mounting means comprising a planular member having a plurality of lens receiving openings therein, a plurality of annular retaining means for securing said lenses in said lens receiving openings with the hemispherical reflectors thereof facing in opposite directions, a pair of parallel bracing members mounted on said planular member, a channel member securely attached to said planular member and said bracing members for supporting said planular member and said bracing members therefrom, and an annular member adapted for attachment to said aircraft and to said channeled member for providing a cantilever support for said Luneberg lenses from said aircraft.

2. In combination with an aircraft, an apparatus mounted on the tail section of the aircraft for picking up radar energy directed toward the aircraft and re-directing the energy back to the transmitting source, said apparatus consisting of a pair of spherical Luneberg radar reflective lenses each having an attached hemispherical radar reflector and a mounting means therefor, said mounting means comprising a flat plate having a pair of lens receiving openings therein, said Luneberg radar reflective lenses being adapted to be received in said openings, one on each side of said flat plate so as to face in opposite directions in tandem relation, an annular flange extending circumferentially of each of said Luneberg radar reflective lenses for limiting the entrance of the lenses into said lens receiving openings, annular retaining means for securing said Luneberg radar reflective lenses in said lens receiving openings, a pair of T-shaped bracing members each having a base portion for abutting an edge of said flat plate and each having a leg portion adapted to be secured to one face of said flat plate, a T-shaped supporting member having a base portion in abutting relation to one end of said flat plate and a leg portion adapted to be secured to said one face of said flat plate, a U-shaped channel member secured to said supporting member, an annular member having a central disk portion secured to said channel member and a peripheral flange adapted to be secured to said tail section of said aircraft, and a plurality of rigidity-inducing bars each attached at one end to said annular plate and at the other end thereof to said flat plate whereby said Luneberg radar reflective lenses will be supported in cantilever fashion from the tail section of the aircraft in longitudinal elongation thereof to provide an unobstructed substantially 360° pickup and reflection of radar energy.

3. In combination with an aircraft, a radar reflecting means and means mounting said radar reflecting means on the tail section of the aircraft in longitudinal elongation thereof, said mounting means comprising a pair of spherical Luneberg radar reflective lenses having integrally attached reflectors, a flat member adapted to receive said Luneberg radar reflective lenses in tandem relation, connecting means attached to said flat member for mounting said flat member on the tail section of the aircraft and antisway means for rigidly bracing said flat member relative to the aircraft.

4. In combination with an aircraft, a device axially aligned with the tail section of the aircraft and extending longitudinally thereof for picking up radar energy from a transmitting source and re-radiating the radar energy back to the transmission source, said device comprising a plurality of Luneberg radar reflective lenses each having a reflector means integral therewith, a mounting means attached to the tail section of the aircraft for supporting said lenses therefrom, said mounting means comprising a flat plate disposed in a vertical plane and having a plurality of lens receiving openings thereon, said lens receiving openings being adapted to receive said lenses in tandem relation and in alternate facing alignment for providing substantially 360° pickup and reflection of the radar energy, and means attached to said flat plate and abutting a portion of said reflector means for secuirng said lenses in said lens receiving openings.

No references cited.